United States Patent [19]

Anderson et al.

[11] 4,108,826

[45] Aug. 22, 1978

[54] FURFURYL ALCOHOL-HEXAALKOXYMETHYLMELAMINE FOUNDRY BINDERS

[75] Inventors: Hugh C. Anderson, Palatine; Russell B. Lembke, Crystal Lake, both of Ill.

[73] Assignee: The Quaker Oats Company, Chicago, Ill.

[21] Appl. No.: 808,022

[22] Filed: Jun. 20, 1977

[51] Int. Cl.$^2$ ............................ C08K 3/36; C08K 7/14
[52] U.S. Cl. .................................. 260/395 B; 164/43; 260/39 R; 260/DIG. 40; 528/249; 528/417; 528/232; 528/408
[58] Field of Search ................. 260/67.6 R, DIG. 40, 260/67.5, 39 R, 395 B; 164/43

[56] References Cited

U.S. PATENT DOCUMENTS

| | | | |
|---|---|---|---|
| 2,518,388 | 8/1950 | Simons | 260/67.6 X |
| 3,008,205 | 11/1961 | Blaies | 260/DIG. 40 |
| 3,523,051 | 8/1970 | Yasutake | 260/67.6 X |
| 3,734,936 | 5/1973 | Brown et al. | 260/DIG. 40 |

*Primary Examiner*—Sandra M. Person
*Attorney, Agent, or Firm*—Joseph P. O'Halloran

[57] ABSTRACT

A foundry binder comprising furfuryl alcohol and hexaalkoxymethylmelamine is disclosed. The binder is substantially anhydrous. In using the binder it is substantially free of formaldehyde odor in the fabrication of the binder, in the production of sand shapes, and in metal foundry pouring operations. The hexaalkoxymethylmelamine does not have to be cooked with the furfuryl alcohol as does formaldehyde in commercial furfuryl alcohol-formaldehyde binders, and yet the binder provides strengths which are comparable to the furfuryl alcohol-formaldehyde binders.

15 Claims, No Drawings

FURFURYL ALCOHOL-HEXAALKOXYMETHYLMELAMINE FOUNDRY BINDERS

BACKGROUND OF THE INVENTION

This invention relates to the foundry art, and, in particular to a sand binder system utilizing furfuryl alcohol monomer.

Generally speaking, the so-called furan foundry binders have been produced from partially resinified mixtures involving furfuryl alcohol, and sometimes including furfural, urea, formaldehyde, phenol and the like.

For the purposes of providing background for the present invention, the furan binders can be regarded as being categorized in one of four classes: namely, monomeric, the cooked type, polymeric, and the phenol containing type. The first type of furan binder generally involves mixing monomeric furfuryl alcohol with resorcinol, for example. The second type involves reacting furfuryl alcohol, urea, and formaldehyde, with an adjustment of pH to 4.5 or higher, by cooking the resulting mixture for 2 hours, for example, at an elevated temperature such as 100° C. Under these conditions, the furfuryl alcohol polymerization is minimal but the conditions do provide for incorporation of the furfuryl alcohol monomer by condensation into a resin with the urea and formaldehyde.

The so-called polymeric type binder involves the admixture of furfuryl alcohol monomer with urea and/or urea formaldehyde with the adjustment of pH to well below 4.5, e.g., 2.0, and cooking to a desired viscosity, for example, at 100° C. Ordinarily the water of condensation is stripped off under reduced pressure and the resulting polymer is quite viscous. This polymer is typically diluted with furfuryl alcohol monomer or in some cases with furfural to get a desired viscosity.

The fourth type of furan binder involves pre-condensation with phenol, and, typically, the phenol is first polymerized with formaldehyde, for example, under alkaline conditions, and the resulting phenol aldehyde is reacted or admixed with furfuryl alcohol polymer typically furfuryl alcohol-formaldehyde or furfuryl alcohol-urea-formaldehyde polymer prior to admixture with sand, for example.

We have discovered a novel binder comprising an admixture of furfuryl alcohol and hexaalkoxymethylmelamine which has tensile strengths comparable to furfuryl alcohol/formaldehyde binders, uses no formaldehyde, and thus has no formaldehyde odor. This novel binder does not have to be cooked, thus offering an advantage over the commercially available furfuryl alcohol binders which contain various amounts of formaldehyde. Furthermore, furfuryl alcohol/hexaalkoxymethylmelamine binders containing up to 20 percent water still have acceptable tensile strengths, which offers an economic advantage.

Hexamethylolmelamine is produced by the reaction of melamine with aqueous formaldehyde using an excess of formaldehyde over the theoretical ratio. The hexamethylol compound is converted to the hexamethoxy derivative by reaction with excess alcohol in the presence of an acid. The reactions occur as follows:

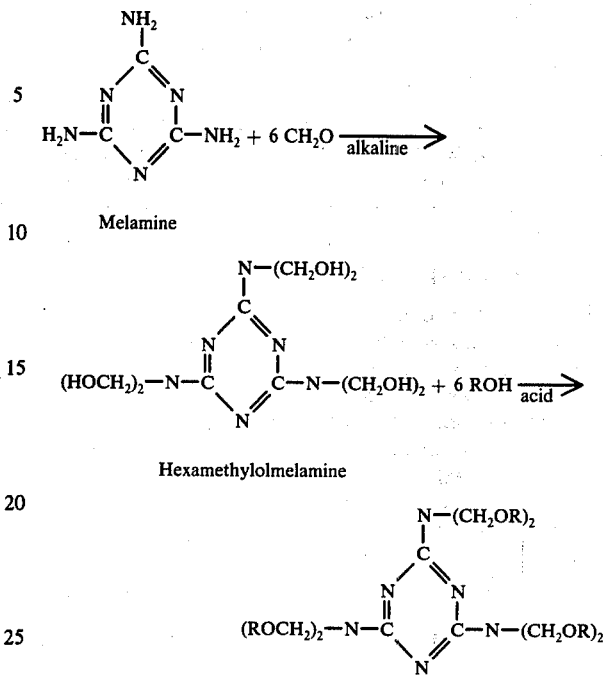

In accordance with the present invention the alcohol used can include those in which R is alkyl having up to 5 carbons. The preferred hexaalkoxymethylmelamine is hexamethoxymethylmelamine, hereinafter referred to as HMMM, although hexaalkoxylmethylmelamines which include combinations of methoxy and ethoxy, combinations of methoxy and butyoxy and other hexaalkoxymethylmelamines in which the alkoxy is derived from an alcohol containing from 1 to 5 carbons, and in which the alkoxy substituents in a given molecule may be the same or different, are useful in accordance with the present invention.

Hexamethoxymethylmelamine, is a highly stable compound, available both in liquid and solid form, and is readily soluble in furfuryl alcohol. The HMMM used in all tests in this disclosure, was American Cyanamid's CYMEL 303. Because the rate of reaction of HMMM with a primary alcohol group is 20 times as fast as the self condensation reaction, we have discovered that HMMM will polymerize with furfuryl alcohol under acidic conditions to form a highly effective foundry binder.

Hexamethoxymethylmelamine is produced by the reaction of melamine with aqueous formaldehyde using an excess of formaldehyde. The hexamethylol compound is converted to the hexamethoxy derivative by reaction with excess methyl alcohol in the presence of an acid.

U.S. Pat. No. 3,346,534 issued to C. A. Bills and P. A. Yureck illustrates the use of a furfuryl alcohol/formaldehyde/urea binder and a modifying compound selected from the group comprising melamine dicyandiamide, benzoguanamine and mixtures thereof. However, the four ingredients are mixed and then cooked and used as a foundry binder for a hot core box. No indication is given as to the structure of the resulting resin. Since no methyl alcohol was added, it is believed apparent that hexamethoxymethylmelamine was not formed.

U.S. Pat. No. 2,562,898 issued to R. N. Evans and A. P. Ingrassia describes a thermal setting resin useful in the preparation of solutions for impregnating and laminating purposes, protective coatings and varnishes, or for the formation of molded articles. This thermal setting resin is produced by reacting lignin, furfuryl alcohol, melamine, and formaldehyde at an elevated temperature.

Another patent which mentions the use of melamine/formaldehyde resins and furfuryl alcohol is U.S. Pat. No. 2,518,388 issued to W. G. Simons, however, no specific examples are given using a melamine/formaldehyde resin.

SUMMARY OF THE INVENTION

The present invention provides a method for manufacturing composite articles, such as for example, sand shapes for use as foundry cores and molds. It also provides a novel composition of matter comprising a mixture of monomeric furfuryl alcohol and hexaalkoxymethylmelamine. In accordance with this invention, hexaalkoxymethylmelamines in which the alkoxy group has up to 4 carbons are preferred. Generally speaking, the method of the present invention comprises preparing a monomeric mixture of furfuryl alcohol and hexaalkoxymethylmelamine, and admixing the resulting mixture with a sand mix comprising sand, and an acid catalyst, placing the resulting sand mixture in a shaping element, and permitting the shaped sand to cure.

Generally speaking, the hexaalkoxymethylmelamine can be present in the furfuryl alcohol-hexaalkoxymethylmelamine mix in an amount ranging from 2 to 40 percent by weight based on the weight of the mixture. A more preferred embodiment, however, utilizes the hexaalkoxymethylmelamine in an amount sufficient to provide from 5 to 15 percent by weight based on the weight of the mixture.

Also, generally speaking, any strong acid catalyst of the type which is well known for polymerizing furfuryl alcohol polymers is useful in accordance with the present invention. However, strong acids and particularly the aromatic sulfonic acids are the most preferred for use as catalyst in accordance with the present invention. The amount of acid added must be sufficient to render the system acidic, and give reasonable bench life. As the level of HMMM increases, given the same amount of acid, the longer the bench life of the resin mixture.

The binder in accordance with the present invention is useful in the manufacture of composite articles such as, for example, composite articles comprising a solid material such as glass fibers or sand, an acid catalyst, and the binder in accordance with the present invention.

The amount of binder which is used in the acid hardenable mix is any amount which would normally be used in a bound composite article, and, for example, foundry sand mixes which have incorporated therein the binder of the present invention in an amount from 0.5 to about 3.0 percent are, generally speaking, emminently satisfactory in accordance with the present invention. However, foundry sand mixes in which the binder is present from about 0.75 to 1.50 percent, inclusive are more preferred. The binder of the present invention can also include diluents useful for economic purposes, although not preferred in accordance with the present invention. These diluents include water, phenol, and ethylene glycol, for example.

The utilization of a reactive silane, preferably either vinyl or amino- silane, is highly advantageous in the practice of the present invention. (See Table I, Tests 1–6.) Generally speaking, we prefer the use of a substituted silane compound in which the molecular weight of the silane moiety is less than 500. Nonetheless, any of the commercially available silanes which are known, in the art, to be useful as glass or silica adhesion promoters can be used, to advantage, in accordance with the present invention. Generally speaking, the adhesion promoter silane is added in an amount from about 0.1 percent to 3 percent based on the weight of the resin, and it is preferred that the silane be added to the resin and well distributed therein prior to the distribution of binder on the sand.

For the purpose of illustrating various silanes which can be used to advantage in accordance with the present invention, and not for the purpose of limiting the use of silanes, the following specific examples are provided. For example, any of the organo silicon compounds referred to in U.S. Pat. No. 3,737,430 to Brown, et al., can be used. In addition, other specific examples include the following:

gamma-mercaptopropyltrimethoxysilane
N-beta-(aminoethyl)-gamma-aminopropyltrimethoxysilane
beta-(3,4-epoxycyclohexyl)ethyltrimethoxysilane
gamma-glycidoxypropyltrimethoxysilane
gamma-aminopropyltriphenoxysilane
gamma-aminopropyltribenzoyoxysilane
gamma-aminopropyltrifurfuroxysilane
gamma-aminopropyltri (o-chlorophenoxy)silane
gamma-aminopropyltri (p-chlorophenoxy)silane, and
gamma-aminopropyltri (tetrahydrofurfuroxy)silane
methyl[2-(gamma-triethoxysilypropyl-amino)ethylamino] 3-propionate in methanol
Modified amino-organosilane
Ureido-silane
mercaptoethyltriethoxysilane
chloropropyltrimethoxysilane
vinyltrichlorosilane
vinyltriethoxysilane
vinyltrimethoxysilane
gamma-methacryloxypropyltrimethoxysilane
gamma-methacryloxypropyltri(2-methoxyethoxy)silane
vinyltrieacetoxysilane
gamma-aminopropyltriethoxysilane Generally speaking, it is preferred that the silane be used in an amount sufficient to provide about 0.15 percent based on the weight of the binder.

EXAMPLE 1

The purpose of this example is to illustrate the use of a binder in accordance with the present invention in preparation of a hardened sand mix, using various ratios of hexamethoxymethylmelamine/furfuryl alcohol, compared to a 100 percent furfuryl alcohol binder and a commercially available furfuryl alcohol binder containing formaldehyde.

The binder is prepared by admixing the furfuryl alcohol, hexamethoxymethylmelamine, (CYMEL 303 T.M. of American Cyanamide Company) and 0.15 percent of a commercially available substituted silane identified as A1160 (T.M. of Union Carbide Corporation) (Ureidosilane, 50 percent in methanol).

A foundry sand mix is then prepared by admixing 3,000 parts foundry sand, and 30 percent (based on binder) of a 65 percent solution of toluene sulfonic acid. The binder, in the amount of 1.5 percent (based on sand)

is added to the sand mix and mulled, until the resin is uniformly distributed on the acid catalyzed sand mix. At this point the sand mix is subjected to bench life determination while, simultaneously tensile testspecimen biscuits (1 inch cross sections) are prepared. The bench life is determined by the use of a Dietert sand rammer. The bench life is arbitrarily determined as the time at which the number of rams required to reach the preset volume is double the number of rams initially required to reach that volume.

The tensile tests are run after overnight storage at the stated relative humidity, and the results of the tests are set forth in Table I. The tensile strength set forth in the table represents an average of 24 determinations, in each instance. A control test was run using Ashland Chemical Company's "Chem-Rez 280", a commercially available furfuryl alcohol-formaldehyde binder reported to contain 67 percent furfuryl alcohol, 1.8 percent free formaldehyde, and .8 percent water.

The results of Tests 1—1 through 1-3 indicate that greater tensile strengths are achieved in the binder systems using various concentrations of hexamethoxymethylmelamine than either the "Chem-Rez 280" control in test 1-5 or the binder containing 100 percent furfuryl alcohol in test 1-4.

TABLE I*

| | FURFURYL ALCOHOL/HMMM BINDERS | | | | |
|---|---|---|---|---|---|
| | | Bench | Tensile Strengths (psi) % | | |
| Test No. | % HMMM | Life Min. | Ambient RH | 93% RH | 65% TSA |
| 1-1 | 15 | 31 | 498 | 398 | 30 |
| 1-2 | 10 | 27 | 487 | 406 | 30 |
| 1-3 | 5 | 17 | 501 | 364 | 30 |
| 1-4 | 0 | 11 | 387 | 286 | 30 |
| 1-5** | (Chem Rez) (280) | 23 | 408 | 311 | 10 |

*1.5% binder on sand
**Not in accordance with the present invention. For comparison purposes only.

EXAMPLE 2

The purpose of this example is to illustrate that the furfuryl alcohol-hexamethoxymethylmelamine binders (in accordance with the present invention) can be cooked or uncooked.

The binder of Test 1 is prepared by blending 90 parts of furfuryl alcohol, 10 parts of hexamethoxymethylmelamine (CYMEL 303) and 0.15 parts A1160 Ureidosilane.

The binder of Test 2 is prepared by mixing 3600 parts of furfuryl alcohol, 400 parts hexamethoxymethylmelamine (CYMEL 303) and 400 parts of water. The pH is then adjusted with toluene sulfonic acid to a pH of 2, and the mix is cooked for 3 hours at a temperature of 102° C. Then the mixture is cooked to 25° C. and 0.15 percent (6.6 parts) (based on the weight of the binder) A1160 Ureido-silane (T.M. of Union Carbide Corporation) is admixed therewith.

Two batches of foundry sand mix is prepared as follows: foundry sand (3000 parts), toluene sulfonic acid (65 percent solution in water, 13.5 parts) are admixed by mulling to achieve an uniform distribution of the acid on the admixture.

Forty five parts by weight of each of the resin binders referred to above in this example is added to a respective batch of sand mix and the respective admixtures are mulled separately. As soon as the respective binders are uniformly distributed on their respective acid catalyzed sand mix, the respective catalyzed resin coated sand mixes are subjected to bench life determination, while simultaneously, tensile strength specimen biscuits (1 inch cross section) are prepared. The bench life is determined by the use of a Dietert sand rammer. The bench life is arbitrarily determined to be the time at which the number of rams required to reach the preset volume is double the number of rams initially required to reach that volume.

The tensile strengths are run after overnight storage at the stated relative humidities, and the results are set forth in Table II. The tensile strengths set forth in the table represent an average of six determinations in each instance.

TABLE II

| | | | Tensile Strength | |
|---|---|---|---|---|
| Test No. | Binder | Bench Life (Min.) | 47% R.H. | 81% R.H |
| 1 | Blend | 23 | 355 | 290 |
| 2 | Cooked | 30 | 355 | 185 |

EXAMPLE 3

The purpose of this example is to illustrate the effect of the amount of binder used on the sand on the resulting tensile strengths. The method used in preparing the binder on the sand mix was that as described in Example 1, and the results are shown in Table III. The results of these tests show that satisfactory tensile strengths are achieved when 0.75 percent binder is used.

EXAMPLE 4

This example is used to compare the effect of the addition of water on the tensile strengths of a furfuryl alcohol binder vs. a furfuryl alcohol/hexamethoxymethylmelamine binder. The binder was prepared using the method in Example 1, except that it was diluted with various percentages of water. The bench life and tensile strengths are determined following the method in Example 1, and the results are shown in Table IV. Tests 4-1 through 4-5 are in accordance with the invention, and tests 4-6 through 4-11 are for comparison purposes only.

Tests 4-2 through 4-5 show that the furfuryl alcohol/hexamethoxymethylmelamine binder in accordance with the invention can be diluted with up to 20 percent water, and the resulting tensile strengths are satisfactory for foundry use. However, when the furfuryl alcohol binder is diluted with more than 10 percent water, as shown in Tests 4-9 and 4-10, very low tensile strengths result.

TABLE III

| | BINDER/SAND RATIO TESTS* | | | |
|---|---|---|---|---|
| Test No. | % Binder Used | % Cat. | Tensile Strength at 30% Humidity (psi) | |
| | | | 95% FA/5% HMMM | Chem Set 505 |
| 3-1 | 0.75 | 30 | 238 | 279 |
| 3-2 | 1.00 | 30 | 303 | 331 |
| 3-3 | 1.50 | 30 | 456 | 528 |

*65% toluene sulfonic acid used as catalyst; 0.15% A1160 silane added

TABLE IV

| Test No. | Binder Composition | | | Bench Life Min. | Tensile Strength 30% rel. Humidity |
|---|---|---|---|---|---|
| | FA | HMMM | Water | | |
| 4-1 | 95 | 5 | — | 60 | 354 |
| 4-2 | 90 | 5 | 5 | 34 | 329 |
| 4-3 | 85 | 5 | 10 | 43 | 291 |
| 4-4 | 80 | 5 | 15 | 50 | 248 |
| 4-5 | 75 | 5 | 20 | 60 | 223 |
| 4-6* | 100 | — | — | 13 | 307 |
| 4-7 | 95 | — | 5 | 24 | 239 |
| 4-8 | 90 | — | 10 | 30 | 220 |

TABLE IV-continued

| Test No. | Binder Composition | | | Bench Life Min. | Tensile Strength 30% rel. Humidity |
|---|---|---|---|---|---|
| | FA | HMMM | Water | | |
| 4-9 | 85 | — | 15 | 33 | 159 |
| 4-10 | 80 | — | 20 | 46 | 120 |
| 4-11 | Chemset 505 | | | 19 | 362 |

Tests 4-6 through 4-11 are not in accordance with the invention

EXAMPLE 5

The purpose of this example is to further illustrate that the addition of a diluent to the furfuryl alcohol/hexamethoxymethylmelamine binder results in better tensile strengths than the dilution of a furfuryl alcohol binder with the same substances. The method used was that as described in Example 1, and the results are shown in Table V.

Tests 5-2, 5-4, and 5-6 are in accordance with the invention, and 5-1, 5-3, 5-5 and 5-7 are not in accordance with this invention. In each comparison, using water, ethylene glycol or phenol, respectively as the diluents, the resulting tensile strengths always were higher when the binder used contained the hexamethoxymethylmelamine in accordance with this invention.

TABLE V
DILUTION OF FA/HMMM BINDERS*

| Test # | % FA | %HMMM | % $H_2O$ | % Ethylene Glycol | % Phenol | Bench Life Min. | Tensile Strength (psi) 26–28% Humidity | 83% Humidity |
|---|---|---|---|---|---|---|---|---|
| 5-1 | 85 | 0 | 15 | 0 | 0 | 38 | 292 | 247 |
| 5-2 | 80 | 5 | 15 | 0 | 0 | 48 | 354 | 265 |
| 5-3 | 85 | 0 | 0 | 15 | 0 | 40 | 290 | 190 |
| 5-4 | 80 | 5 | 0 | 15 | 0 | 66 | 368 | 204 |
| 5-5 | 85 | 0 | 0 | 0 | 15 | 7 | 263 | 228 |
| 5-6 | 80 | 5 | 0 | 0 | 15 | 12 | 316 | 239 |
| 5-7 | 100 | 0 | 0 | 0 | 0 | 10 | 437 | 324 |

*0.15% A1160 silane (based on binder); 30% of 65% TSA (based on binder); 1.5% binder on sand. Tests 5-1, 5-3, 5-5 and 5-7 are not in accordance with this invention.

EXAMPLE 6

The purpose of this example is to illustrate the use of a furfuryl alcohol/hexamethoxymethylmelamine binder for making a steel casting mold.

The sand mix is prepared using a Fordath continuous mixer with Wedron 5025 silicon sand at a flow rate of 32.3 kg/minute. 1.2 percent of a binder, based on the sand, consisting of 95 percent furfuryl alcohol and 5 percent hexamethoxymethylmelamine is used. The catalyst used is 65 percent toluene sulfonic acid solution in water at a concentration of 30 percent, based on the weight of the binder. In each instance the binder is silanized with 0.15 percent A1100 silane (a triethoxyaminopropylsilane). Thiem Chemset 505 (T.M. of Thiem Corporation) is used for comparison. No core wash is applied to any of the molds. The physical properties of the specimens prepared from these sand mixes are shown in Table VI. The bench life and tensile strength are determined as described in Example 1.

The molds are poured using 1025 steel, and are shaken out 30 minutes after pouring. The castings are shot blast for 7 minutes, and are then ground to remove any flash.

In the tests reported, the casting prepared with the furfuryl alcohol/hexamethoxymethylmelamine resin mold had no pin holes, while the control had one large pinhole 1½ inches deep, along with one smaller pinhole. The percent nitrogen $N_2$ level on the sand, based on calculations for the furfuryl alcohol/hexamethoxymethylmelamine binder was 0.0064 percent, while the Chemset 505 was 0.021 percent.

TABLE VI

| Test No. | Binder | Bench Life (min.) | Tensile Strength (psi)/ scratch hardness | |
|---|---|---|---|---|
| | | | 8% Rel. Humidity | 93% Rel. Humidity |
| 1 | 95% FA/5% HMMM | 11 | 510/80 | 325/79 |
| 2 | Chemset 505 | 20 | 360/78 | 225/78 |

EXAMPLE 7

The purpose of this example is to illustrate the use of various hexaalkoxymethylmelamines in the binders in accordance with the present invention.

The binder in each test is prepared by blending 95 parts of furfuryl alcohol, 5 parts of a hexaalkoxymethylmelamine, and 0.15 parts of A1160 Ureido silane.

In each test the foundry sand mix is prepared as follows: foundry sand (3,000 parts), toluene sulfonic acid (65 percent aqueous solution, (30 parts) were admixed by mulling to achieve a uniform distribution of the acid on the admixture.

Respective portions of 45 parts by weight of each of the respective resin binders referred to above in this example are added to its respective batch of sand mix and the respective admixtures are mulled separately. As soon as the respective binders are uniformly distributed on their respective acid catalyzed sand mix, the respective catalyst resin coated sand mixes are subjected to bench life determinations, while simultaneously, tensile strength specimen biscuits (1 inch cross section) are prepared. The bench life is determined by the use of a Dietert sand rammer. The bench life is arbitrarily determined to be the time in which the number of rams required to reach the preset volume is double the number of rams initially required to reach that volume.

The tensile strengths are run after overnight storage at the stated relative humidities, and the results of the tests are set forth in Table VII. The tensile strengths set forth in the table represent an average of 24 determinations in each instance.

TABLE VII

| Test No. | Melamine Derivative* | Tensile Strengths (psi) | | Bench Life (min.) |
|---|---|---|---|---|
| | | 40% R.H. | 71% R.H. | |
| 7-1 | HMMM (1) | 386 | 373 | 17 |
| 7-2 | HM/EMM (2) | 378 | 360 | 18 |
| 7-3 | HM/n-BMM (3) | 362 | 353 | 17 |
| 7-4 | Hn-BMM (4) | 357 | 328 | 16 |

TABLE VII-continued

| Test No. | Melamine Derivative* | Tensile Strengths (psi) 40% R.H. | 71% R.H. | Bench Life (min.) |
|---|---|---|---|---|
| 7-5 | Furfuryl Alcohol (5) | 310 | 274 | 13 |

(1) HMMM (CYMEL 303)/Hexamethoxymethylmelamine)
(2) HM/EMM (CYMEL 1116/highly methylated/ethylated methylmelamine
(3) HM/n-BMM (CYMEL 1130/highly methylated/butylated methylmelamine)
(4) Hn-BMM (CYMEL 1156/highly butylated methylmelamine)
(5) This test is not in accordance with this invention.
*All melamine derivatives are commercial grade CYMEL melamines, T.M. of American Cyanamid Company.

We claim:

1. A composition comprising a mixture of monomeric furfuryl alcohol and hexaalkoxymethylmelamine, in which the hexaalkoxymethylmelamine is present in an amount sufficient to provide from 2 to 40 percent by weight based on the weight of the mixture.

2. The composition of claim 1 in which the hexaalkoxymethylmelamine is selected from those hexaalkoxymethylmelamines in which the alkoxy portion thereof has up to 4 carbons.

3. The composition of claim 1 in which the hexaalkoxymethylmelamine is present in an amount from 5 to 15 percent by weight based on the weight of the mixture.

4. The composition of claim 1 in which the hexaalkoxymethylmelamine is hexamethoxymethylmelamine.

5. The composition of claim 1 which has admixed therewith a silane.

6. The method of making composite articles wherein a solid material such as glass fiber or sand is shaped into a solid resin-bound article, comprising the steps:
   (a) preparing a binder by admixing hexaalkoxymethylmelamine and monomeric furfuryl alcohol in an amount such that the hexaalkoxymethylmelamine is present between 2 and 40 percent by weight based on the weight of the mixture;
   (b) admixing the resulting binder with an acid catalyzed solid material;
   (c) shaping the resulting binder-catalyzed solid material mixture, and
   (d) permitting the resulting shaped mass to remain in such shape for a period of time sufficient for the binder to harden.

7. The method of claim 6 in which the hexaalkoxymethylmelamine is selected from those hexaalkoxymethylmelamines in which the alkoxy portion thereof contains up to 4 carbon atoms.

8. The method of claim 6 in which the hexaalkoxymethylmelamine is present in the mixture in an amount between 5 and 15 percent by weight.

9. The method of claim 6 in which the hexaalkoxymethylmelamine is hexamethoxymelamine.

10. The method of claim 6 which includes adding silane to said binder prior to admixture of said binder with the acid catalyzed solid material.

11. The method of making foundry articles wherein sand is shaped into a solid resin-bound article, comprising the steps:
    (a) preparing a binder by admixing monomeric furfuryl alcohol with hexaalkoxymethylmelamine, the hexaalkoxymethylmelamine being admixed in an amount from 2–40 percent by weight based on the weight of the resulting admixture;
    (b) admixing the resulting binder with an acid catalyzed sand, the binder being used in an amount between 0.5–4 percent by weight;
    (c) shaping the resulting binder-catalyzed sand mixture and
    (d) permitting the resulting shaped sand mass to remain in said shape for a period of time sufficient for the binder to harden.

12. The method of claim 11 in which the hexxalkoxymethylmelamine is selected from those hexaalkoxymethylmelamines which contain an alkoxyl portion thereof having up to 4 carbon atoms.

13. The method of claim 11 in which the hexxalkoxymethylmelamine is hexamethoxymelamine.

14. The method of claim 11 in which the hexaalkoxymethylmelamine is present in the binder in an amount between 5–15 percent by weight.

15. The method of claim 11 in which the binder includes a silane.

* * * * *